Sept. 1, 1925.
T. W. GREEN
ADJUSTABLE SHAFT BEARING
Filed March 14, 1923    2 Sheets-Sheet 1
1,552,054
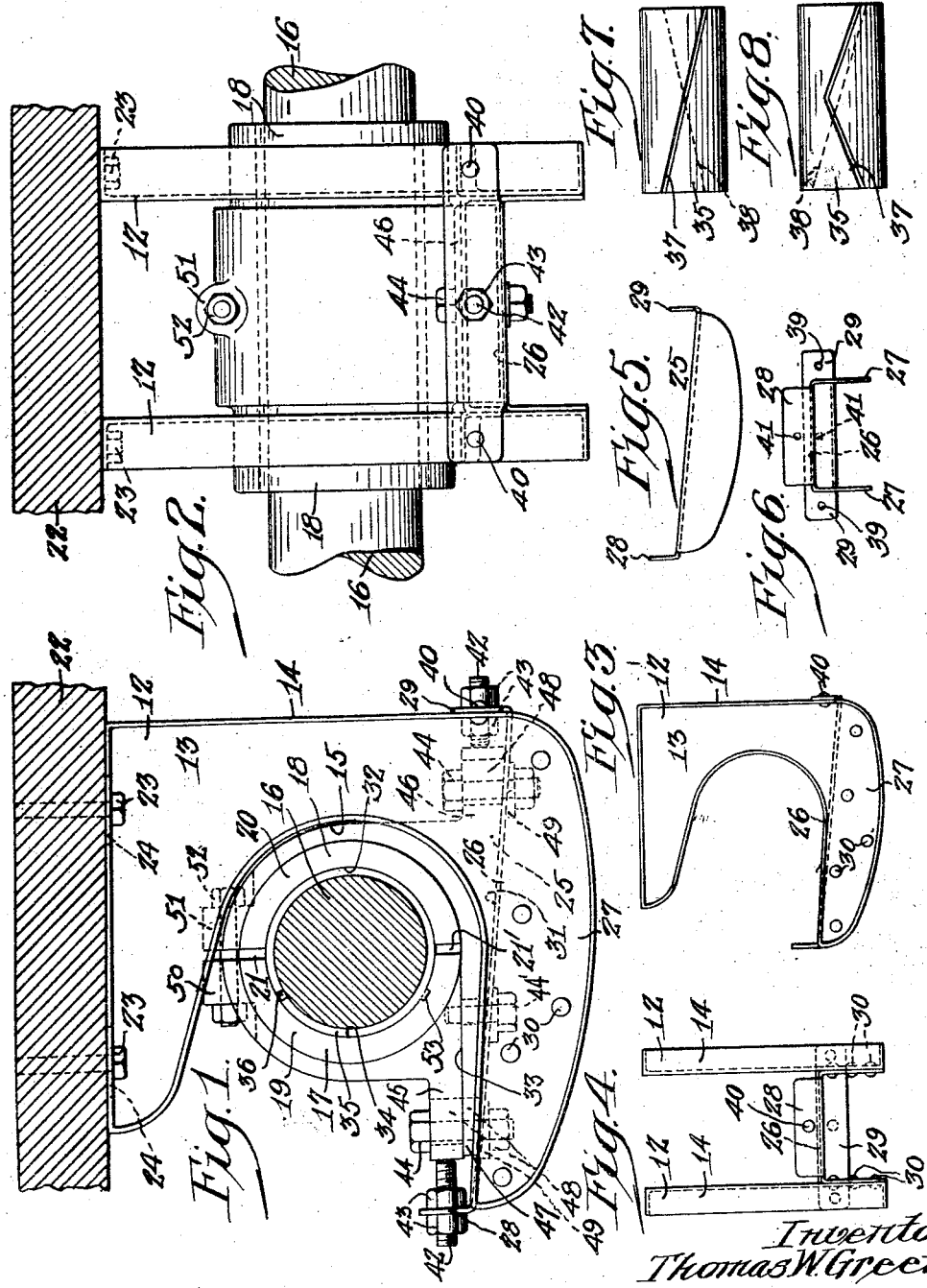
Inventor:
Thomas W. Green.
Witness:
Walter Chin
by
Attorney

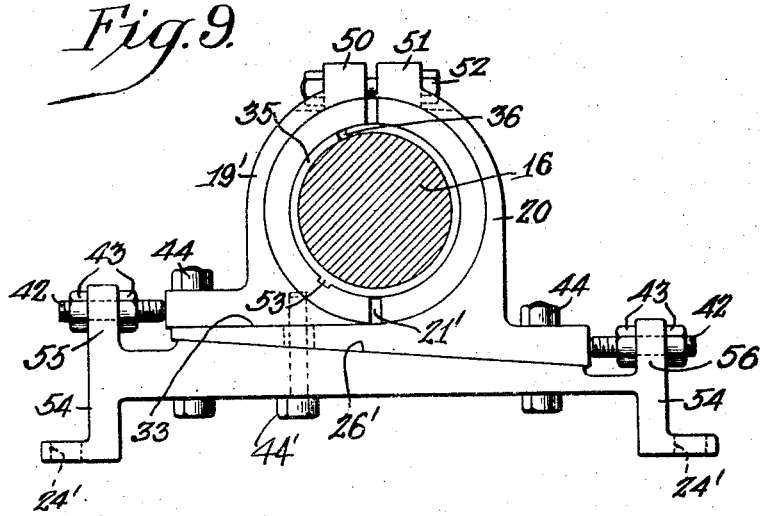
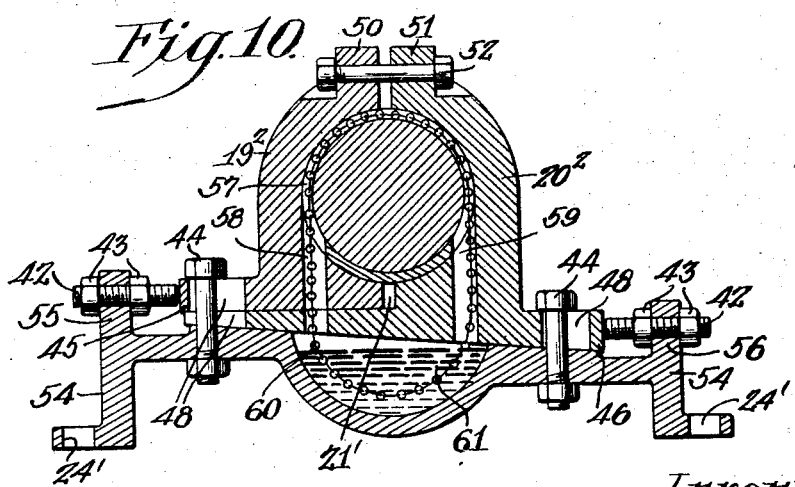

Patented Sept. 1, 1925.

1,552,054

UNITED STATES PATENT OFFICE.

THOMAS W. GREEN, OF PHILADELPHIA, PENNSYLVANIA.

ADJUSTABLE SHAFT BEARING.

Application filed March 14, 1923. Serial No. 624,892.

*To all whom it may concern:*

Be it known that I, THOMAS W. GREEN, a citizen of the United States, residing at Philadelphia, in the county of Philadelphia and State of Pennsylvania, have invented a certain new and useful Adjustable Shaft Bearing, of which the following is a specification.

My invention relates to bearings for shafts such as are used for main and counter-shafting, etc., and which are mounted by means of hangers, pedestals, brackets, etc.

The purpose of my invention is to provide take-ups for divided bearing members, adjusting from the side and one of which lifts both bearing members.

A further purpose is to divide the bearing at the top and bottom, make the adjustment of the two parts laterally, and combine vertical and lateral adjustment in one member and lateral adjustment only in the other member by which the bearing is formed.

A further purpose is to mount one of two laterally movable bearing parts upon a sloping support or seat along which it is adjustable, and to mount the second member upon a horizontal guide carried by the first.

A further purpose is to form a hanger or pedestal of flanged sheet metal to which flanges of a sheet metal support or seat for the bearing members are attached in canted position and to adjust the bearing members by screws at the ends of the support.

Further purposes will appear in the specification and in the claims.

I have preferred to illustrate my invention by but a few of the possible forms from among the many types and kinds of construction to which it may be applied, selecting forms that are practical, efficient, reliable and inexpensive and which at the same time well illustrate the principles of my invention.

Figure 1 is an end elevation of a hanger and bearing showing a preferred form of my invention.

Figure 2 is a front elevation of the structure seen in Figure 1.

Figures 3 and 4 are side and front elevations respectively of the hanger of Figure 1, omitting the bearing and adjusting studs.

Figures 5 and 6 are side and front elevations of the bearing support or seat forming part of the hanger.

Figures 7 and 8 are reduced elevations of different forms of liners which may be used.

Figure 9 is a side elevation of a second form of my invention.

Figure 10 is a vertical central section of still another form, the section being taken through the center of the bearing.

In the drawings similar numerals indicate like parts.

In its broadest aspects one feature of my invention is independent of the character of support, whether cast iron or pressed metal and whether hanger, bracket or pedestal, etc. This broad feature runs through the several figures of the application, depending as it does, upon provision of an outside sloping support for one of two laterally movable bearing members and a support upon the first for the other bearing member, the second support being horizontal. However, another phase of my invention relating to the construction of the support for the bearing parts to provide the first (outside) support is dependent upon pressed metal construction.

Taking up the pressed metal construction first, because it is the most desirable construction from a manufacturer's and user's standpoint, I show a pair of bracket sides 12, shown in use as parts of a hanger and comprising each a web 13 and a surrounding flange 14. The flanges face oppositely and the sides vary in general contour with the size and strength required. The bracket edges are recessed at 15 to allow the passage of a transversely disposed shaft 16 and to accommodate the ends 17, 18 of laterally movable bearing members 19 and 20.

The division between these bearing members at 21 and 21' is transverse to the paths of movement of the members, here preferably within or near a vertical plane through the axis of the shaft 16, so that the bearing members may be adjusted laterally to tighten up the bearing.

The hanger sides are secured to the beam 22 by means of bolts 23 passing through slots 24 in the flanges. These slots permit lateral adjustment of the hanger where desired to assist in height adjustment.

Between the sides I place a connecting base 25 comprising a support for the bearing members, having a seat 26, side flanges 27 and end flanges or ears 28 and 29. The side flanges are riveted to the facing sides of the webs 13 at 30 in such position as to locate the seat 26 at an angle to the horizontal which may slope either way but which is shown as having the left end in Figure 1 higher than the right, the more convenient construction for this form.

Upon the seat is placed a preferably cast metal bearing member 20 which has a tapered base 31 whose taper is intended approximately to conform with the slope of the seat 26, so that the bearing member shall be adjustable from right to left in the illustration to move the interior 32 of the bearing member toward the shaft and at the same time to lift the bearing member bodily along the taper of the seat.

The lifting effect may be increased by moving the hanger to the right (for which the slots offer room) and then tightening up the member 20 by the additional distance and vertical adjustment separately may be secured by this means.

The bearing member 20 projects at the left to form a tapered extension whose upper surface provides a support in the form of a guide 33 for the second bearing member. I make the guide 33 horizontal.

Upon the guide 33 is mounted the bearing member 19 whose inner face 34 cooperates with the face 32 of member 20 to substantially enclose and to support the bearing. A liner 35 is placed between the inner faces 32 and 34 of the bearing members and the shaft. It may be integral, cut at one point 26 only as in Figure 1 or may be split in parts as in Figures 7 and 8 with any departure from the normal slope of the adjoining edges as at 37 and 38 in Figures 7 and 8.

The flange 29 is riveted to the flange 14 through openings 39 by rivets 40 and both flanges 28 and 29 are apertured at 41 to receive adjusting screws in the form of studs 42, adjusted and held in place by nuts 43 located on opposite sides of the respective flanges 28 and 29.

Bolts 44, 44′ pass through the bearing members and the seat in the positions to which they have been adjusted and, to allow adjustment and a second fastening in the adjusted position, either the seat or the flanges 45, 46 may be slotted as at 48 and the other one apertured. In each case on account of the taper I have shown a taper washer 49. One bolt 44 and bolt 44′ pass through both bearing members, doing double duty, whereas the other bolt 44 passes through one only of these bearing members.

At the top the bearing members are flanged at 50, 51 for a bolt 52 which passes through both flanges and holds the bearing members at the top to their duty in adjusted positions.

In assemblage the support carrying the seat is riveted to the side bracket members and the bearing member 20 is placed in position upon the seat before the hanger is placed. The bearing member 19 is then mounted upon the bearing member 20 and the liner is placed about the shaft and is slid in between the bearing members. The latter are then set by means of the studs 42 after which they are supported against movement at the top away from each other by the bolt 52 and are held to relative position at the bottom by the bolts through the seat and flanges.

In use the shaft sags relatively, causing a wear at the bottom of the bearing which has not hitherto properly been compensated for in bearings having approximately vertical division lines, but my sloping seat for the bearing members causes one bearing member to lift at the same time that it adjusts the wear from the side. Since the bearing member 19 can move upon the bearing member 20 without change of its height, the left hand bearing member can be adjusted freely to take up lateral wear and is itself adjusted vertically along with lateral and vertical adjustment of bearing member 20. Adjustment of the bearing member 20 toward the shaft causes both bearing members to be lifted also, and one member to be adjusted laterally. Member 19 must be additionally shifted to the right in the illustrations to make up for the movement of member 20 to the left.

The liner 34 being axially insertable and removable gives opportunity to substitute other liners for those showing wear.

The liner can be maintained in any positions desired by use of a key 53 fitting into a recess in one of the bearing members.

In the form shown in Figure 9 the seat 26′ is shown as integral with legs 54 and with lugs 55, 56 by which the studs 42 are supported. The bearing members 19′, 20′ are of the same general character as those seen in Figures 1–6 and bear the same relation to the seat and lugs. The same type of fastening devices at the tops of the bearing members through flanges 50 and 51 and bolts 44 through the lower flanges perform the same functions as in the structures of Figures 1–6.

In the form shown in Figure 10 the parts are in the same general form and the same general relation as in Figure 9 with the difference, however, that both bearing members 19² and 20² are lifted to give additional room and are recessed about and transversely to the shaft at 57, 58 and 59 to allow an oiling chain 57 to serve for oiling purposes. The lower part of the chain rests within oil in a pool 58.

In all of the forms one of the bearing members is mounted upon a sloping seat and the other is mounted upon the first. By this means adjustment of the first member up the slope of the seat tightens it laterally and at the same time lifts both members to any extent, determined by the amount of slope. Adjustment of the second member upon the first, however, is free from lifting effect by reason of the horizontal character of the guide.

In view of my disclosure other devices for securing all or part of the benefit of my invention without copying my form will doubtless occur to those skilled in the art and it is my purpose to protect herein all such as come within the reasonable spirit and scope of my invention.

Having thus described my invention, what I claim as new and desire to secure by Letters Patent is—

1. In a shaft bearing, a support, a seat thereon at an angle to the horizontal, a bearing member adapted to fit about the shaft on one side laterally with respect to the seat as a base, having a tapered bottom portion resting upon the seat at its lower surface and forming a guide at its upper surface whose length is generally transverse to the shaft, a second bearing member adapted to fit about the opposite side of the shaft and resting upon the guide on the first bearing member and fastening devices for holding the bearing members together and retaining them in set position with respect to the seat.

2. In a bearing for shafts, a support, a seat thereon, a bearing member adapted to fit about one side of the shaft laterally with respect to the seat as a base having a tapered extension on the other side of the shaft, fitting the seat and affording a guide spaced by it from the seat, the length of the guide being generally transverse to the shaft, a second bearing member surrounding the other half of the shaft and fitting the guide, adjusting devices rigid with the seat for moving the two bearing members, the one upon the seat and the other upon the first and clamping means for holding the bearing members upon the seat and to their duty about the shaft.

3. In a bearing for shafts, a support, a seat thereon, a bearing for half of the shaft fitting the seat and having a guide on a face opposite to the seat at an angle to the seat, the length of the guide being generally transverse to the shaft, a second bearing for the other half of the shaft mounted upon the guide, a bolt holding the two bearing members together, the bolts holding the bearing members rigid with respect to the seat and threaded adjustments for the position of the two bearing members with respect to the seat and each other.

4. In a bearing for shafts, a support, a seat thereon, flanges rigid with respect to the seat, a bearing for half of the shaft laterally with respect to the seat as a base fitting the seat on one face and having an adjoining face at an angle with respect to the seat and in length generally transverse to the shaft, a bearing member for the second half of the shaft guided by the second face, studs passing through the flanges and adjustable with respect thereto, engaging the two bearing members to position them with respect to the shaft and fastening devices for holding the two members in adjusted position with respect to each other and to the seat.

5. In a bearing for shafts, a support, a seat thereon, a split bearing comprising two parts, one movable along the seat and the other movable upon the first nearly parallel to the seat and in length generally transverse to the shaft and adjusting devices for moving the bearing members with respect to the length of the seat.

6. In a bearing for shafts, a support, a seat thereon, a split bearing comprising two parts, one movable along the seat, the other movable upon the first nearly parallel to the seat and in length generally transverse to the shaft, and adjusting devices for moving the bearing members with respect to the seat and fastening devices for holding the bearing members together and rigid with respect to the seat.

7. In a bearing for shafts, a support, a seat thereon, a bearing comprising two parts, one movable along the seat and the other movable upon the first, nearly parallel to the seat and in length generally transverse to the shaft, adjusting devices for moving the bearing members with respect to the length of the seat, ears rigid with the seat at the ends of the seat, threaded adjusting devices passing through the ears and determining the positions of the bearing members with respect to the length of the seat and threaded fastening devices for holding the bearing members rigid with respect to the seat and to each other.

8. In a shaft bearing, vertically divided bearing parts, one guided upon the second laterally of the bearing, a seat for the second part at an angle to the guide and adjusting and fastening devices for the parts.

9. In a shaft bearing, a pair of bearing parts divided and each surrounding part of the shaft, a liner inside the bearing parts, a substantially horizontal guide formed upon one of the parts for the other and in length generally transverse to the shaft, a tapered seat for the second at an angle to the horizontal and adjusting and securing screws for the parts.

THOMAS W. GREEN.